US010405492B2

(12) United States Patent
Ricketts et al.

(10) Patent No.: US 10,405,492 B2
(45) Date of Patent: Sep. 10, 2019

(54) SELF-CLEANING ROCK SUMP FOR AN AGRICULTURAL HARVESTER AND RELATED SYSTEMS AND METHODS

(71) Applicant: CNH Industrial America, LLC, New Holland, PA (US)

(72) Inventors: Jonathan E. Ricketts, Coal Valley, IL (US); Todd W. Stegmiller, Rock Island, IL (US); Kevin Hammer, Eldridge, IA (US); William L. Cooksey, Geneseo, IL (US)

(73) Assignee: CNH Industrial America LLC, New Holland, PA (US)

( * ) Notice: Subject to any disclaimer, the term of this patent is extended or adjusted under 35 U.S.C. 154(b) by 0 days.

(21) Appl. No.: 15/626,262

(22) Filed: Jun. 19, 2017

(65) Prior Publication Data
US 2018/0359924 A1 Dec. 20, 2018

(51) Int. Cl.
*A01D 75/18* (2006.01)
*A01F 12/16* (2006.01)
*A01F 12/10* (2006.01)

(52) U.S. Cl.
CPC ............ *A01D 75/187* (2013.01); *A01F 12/10* (2013.01); *A01F 12/16* (2013.01)

(58) Field of Classification Search
CPC ......... A01F 12/16; A01D 75/187; A47L 9/20; A47L 11/4025
USPC ......... 298/25, 29, 1 B; 15/257.3, 257.6, 347, 15/352
See application file for complete search history.

(56) References Cited

U.S. PATENT DOCUMENTS

| 2,812,766 | A | 11/1957 | Goffnett |
| 3,433,230 | A | 3/1969 | Larsen |
| 3,576,188 | A | 4/1971 | Tanis |
| 3,645,269 | A | 2/1972 | Peruski |

(Continued)

FOREIGN PATENT DOCUMENTS

| DE | 2037659 A1 | 4/1971 |
| DE | 2024706 A1 | 12/1971 |

(Continued)

OTHER PUBLICATIONS

European Search Report for European Application No. 18178305.1, dated Oct. 9, 2018 (6 pages).

*Primary Examiner* — Alicia Torres
(74) *Attorney, Agent, or Firm* — Peter K. Zacharias; Patrick M. Sheldrake (57) ABSTRACT

A self-cleaning sump for an agricultural harvester may include a collection chamber defining a top end and a bottom end. The self-cleaning sump may also include a sump door positioned at the bottom end of the collection chamber, with the sump door being movable between an opened position and a closed position. Additionally, the self-cleaning sump may include a cleaning device movable within the collection chamber between a raised position and a lowered position and an actuator coupled to the cleaning device. The actuator may be configured to actuate the cleaning device between the raised and lowered positions independent of the sump door. When the actuator is activated, the cleaning device may be configured to contact collected material contained within the collection chamber as the cleaning device is moved within the collection chamber between the top and bottom ends of the chamber.

16 Claims, 4 Drawing Sheets

(56) References Cited

U.S. PATENT DOCUMENTS

| | | | |
|---|---|---|---|
| 3,648,709 A * | 3/1972 | De Coene | A01F 12/10 |
| | | | 460/106 |
| 3,664,348 A | 5/1972 | Maiste et al. | |
| 3,675,660 A | 7/1972 | Girodat | |
| 3,971,390 A | 7/1976 | McDuffie | |
| 4,195,644 A | 4/1980 | Ryczek | |
| 4,288,969 A | 9/1981 | Underhill | |
| 4,446,875 A | 5/1984 | Deleu | |
| 4,467,819 A | 8/1984 | Musser et al. | |
| 4,538,625 A | 9/1985 | Fortune et al. | |
| 4,657,029 A | 4/1987 | Helm et al. | |
| 4,768,525 A | 9/1988 | Tanis | |
| 5,019,014 A | 5/1991 | Hirsch et al. | |
| 5,273,488 A | 12/1993 | Hollevoet | |
| 5,324,231 A | 6/1994 | Van Herpe et al. | |
| 5,882,257 A | 3/1999 | Cooksey et al. | |
| 7,470,180 B2 | 12/2008 | Honey | |
| 2016/0183750 A1 * | 6/2016 | Fan | A47L 9/106 |
| | | | 15/347 |

FOREIGN PATENT DOCUMENTS

| | | | |
|---|---|---|---|
| EP | 0516892 | 12/1992 | |
| EP | 1530895 | 5/2005 | |
| EP | 2294909 | 3/2011 | |
| WO | WO 2015/028854 | 3/2015 | |
| WO | WO-2016064854 A1 * | 4/2016 | A01F 12/16 |

* cited by examiner

SELF-CLEANING ROCK SUMP FOR AN AGRICULTURAL HARVESTER AND RELATED SYSTEMS AND METHODS

FIELD OF THE INVENTION

The present subject matters relates generally to agricultural harvesters and, more particularly, to a self-cleaning rock sump for an agricultural harvester and related systems and methods.

BACKGROUND OF THE INVENTION

Typically, a combine harvester has at its front end an intake feeder system that cuts crop from the around and feeds it to a threshing mechanism. The intake feeder system comprises a header and a feeder elevator that raises the crop to the level of the mouth of the threshing mechanism. Commonly, the header, which takes different forms depending on the type of crop, is wider than the elevator and is provided with two augers arranged one at each side of the header to push the cut crop towards the central elevator. The threshing mechanism separates the grain from the stalks, or straw, and the chaff. The grain is stored in a tank on board the harvester while the straw and the chaff are discharged from the rear end of the harvester.

The threshing is carried out by passing the crop between a rotating cylinder and a surrounding concave. The cylinder has threshing elements on its surface that separate the grain by beating and crushing the crop against the surrounding concave, and the latter has openings through which the separated grain can fall to be transferred to the storage tank. Depending on the design of the harvester, the cylinder may be disposed longitudinally or transversely.

If rocks or large stones are picked up by the intake feeder system, they can damage the threshing mechanism. To prevent such foreign materials from being conveyed to the threshing mechanism, a feed beater is typically provided between the aft end of the feeder elevator and the threshing mechanism to separate the foreign materials from the harvested crop materials. For instance, the feed beater may be configured to impact rocks and large stones, forcing such materials downwardly into a rock sump positioned below the beater.

After operating the harvester for a given time period, the rock sump can become full of rocks and other foreign materials and, thus, must be cleaned. Typically, a rock sump includes a door at its bottom end that is configured to be manually opened to allow the collected foreign materials to fall out of the sump via gravity. However, in many instances, the foreign materials contained within the rock sump become lodged or trapped within the sump, thereby preventing the collected materials from dropping out of the sump when the door is opened. In such instances, the operator is required to manually dislodge the collected material from within the sump, which is often very time consuming and labor intensive.

Accordingly, a self-cleaning rock sump that allows rocks, stones and/or other foreign material to be efficiently and effectively evacuated or cleaned from the sump would be welcomed in the technology.

BRIEF DESCRIPTION OF THE INVENTION

Aspects and advantages of the invention will be set forth in part in the following description, or may be obvious from the description, or may be learned through practice of the invention.

In one aspect, the present subject matter is directed to a self-cleaning sump for an agricultural harvester. The self-cleaning sump may include a collection chamber defining a top end and a bottom end. The self-cleaning sump may also include a sump door positioned at the bottom end of the collection chamber, with the sump door being movable between an opened position and a closed position. Additionally, the self-cleaning sump may include a cleaning device movable within the collection chamber between a raised position and a lowered position and an actuator coupled to the cleaning device. The actuator may be configured to actuate the cleaning device between the raised and lowered positions independent of the sump door. When the actuator is activated, the cleaning device may be configured to contact collected material contained within the collection chamber as the cleaning device is moved within the collection chamber between the top and bottom ends of the chamber.

In another aspect, the present subject matter is directed to a system for automatically cleaning an agricultural harvester. The system may include a sump having a collection chamber that defines a top end and a bottom end. The sump may also include a sump door positioned at the bottom end of the collection chamber, with the sump door being movable between an opened position and a closed position. The system may also include a cleaning device movable within the collection chamber between a raised position and a lowered position and an actuator coupled to the cleaning device. The actuator may be configured to actuate the cleaning device between the raised and lowered positions independent of the sump door. In addition, the system may include a controller configured to electronically control an operation of the actuator. When the actuator is activated by the controller, the cleaning device may be configured to contact collected material contained within the collection chamber as the cleaning device is moved within the collection chamber between the top and bottom ends of the chamber.

In a further aspect, the present subject matter is directed to a Method for automatically cleaning a sunup of an agricultural harvester, wherein the sump includes a collection chamber defining a top end and a bottom end. The method may include moving, with a computing device, a sump door of the sump from a closed position to an opened position. In addition, the method may include actuating, with the computing device, a cleaning device within the collection chamber independent of the door such that the cleaning device is moved from a raised position to a lowered position relative to the collection chamber, wherein the cleaning device is configured to contact collected material contained within the collection chamber as the cleaning device is moved between the raised and lowered positions.

These and other features, aspects and advantages of the present invention will become better understood with reference to the following description and appended claims. The accompanying drawings, which are incorporated in and constitute a part of this specification, illustrate embodiments of the invention and, together with the description, serve to explain the principles of the invention.

BRIEF DESCRIPTION OF THE DRAWINGS

A full and enabling disclosure of the present invention, including the best mode thereof, directed to one of ordinary skill in the art, is set forth in the specification, which makes reference to the appended figures, in which.

DETAILED DESCRIPTION OF THE INVENTION

Reference now will be made in detail to embodiments of the invention, one or more examples of which are illustrated in the drawings. Each example is provided by way of explanation of the invention, not limitation of the invention. In fact, it will be apparent to those skilled in the art that various modifications and variations can be made in the present invention without departing from the scope or spirit of the invention. For instance, features illustrated or described as part of one embodiment can be used with another embodiment to yield a still further embodiment. Thus, it is intended that the present invention covers such modifications and variations as come within the scope of the appended claims and their equivalents.

In general, the present subject matter is directed to a self-cleaning rock sump for an agricultural harvester. Specifically, in several embodiments, the sump may include a collection Chamber at least partially defining an internal volume for retaining rocks, stones, and other foreign materials falling between the feeder elevator and the threshing mechanism of the harvester. Additionally, the rock sump may include a sump door positioned at or adjacent to the bottom end of the collection chamber that is configured to be moved between a closed position, where the door defines a bottom wall of the chamber, and an opened position, where the door is pivoted away from the chamber such that the bottom of the chamber is open. Moreover, in accordance with aspects of the present subject matter, the disclosed rock sump may also include a cleaning device movable within the collection chamber. As such, when the door is moved to the opened position, the cleaning device may be actuated between the between the top and bottom ends of the collection chamber to knock down or otherwise remove collected materials that may otherwise be stuck or lodged within the chamber.

In several embodiments, the cleaning device may include a grate (e.g., a finger grate) configured to be disposed at a raised position adjacent to the top end of the collection chamber during normal operation of the harvester. In such embodiments, the openings or voids defined by the grate may be large enough to allow rocks and/or other foreign material to fall through the grate and into the collection chamber. Additionally, when actuated, the grate may be configured to be lowered within the collection chamber from the raised position to a lowered position at which the grate is located closer to the bottom end of the collection chamber. As the grate is lowered, the grate fingers or elements may contact any foreign material lodged or stuck within the chamber, thereby knocking the material down and allowing it fall out of the chamber.

Moreover, it should be appreciated that the present subject matter is also directed to related systems and methods for cleaning a rock sump of an agricultural harvester. Specifically, in several embodiments, a controller (e.g., a computing device) may be communicatively coupled to both a door actuator configured to actuate the sump door between its opened and closed positions and a grate actuator configured to actuate the grate between its raised and lowered positions. In such an embodiment, the controller may be configured to electronically control the operation of the actuators to execute an automatic sump cleaning mode during which the sump is cleaned. For instance, upon receipt of a suitable input from the operator of the harvester, the controller may be configured to control the operation of the door actuator to move the door from its closed position to the opened position. Once the door has been opened, the controller may be configured to control the operation of the grate actuator to move the grate within the collection chamber from its raised position to its lowered position, thereby allowing the grate to be used to clean out the sump. In such an embodiment, the controller may, for example, cycle the grate between its raised and lowered positions to ensure that the sump has been properly cleaned prior to closing the sump door.

Figure 1:
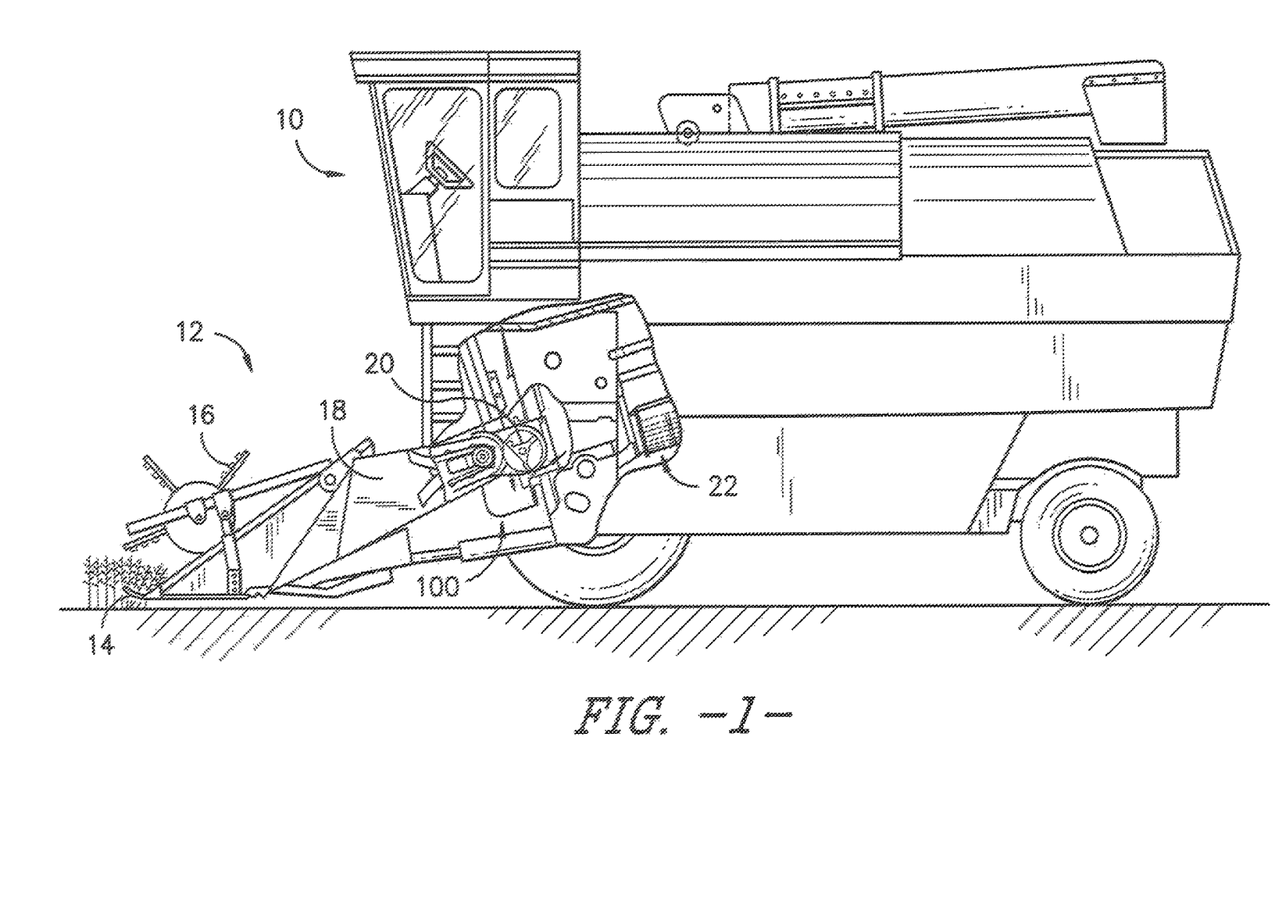
FIG. 1 illustrates a side view of one embodiment of an agricultural harvester in accordance with aspects of the present subject matter, particularly illustrating a portion of the harvester cut-away to allow various internal components of the harvester to be viewed.

Referring now to FIG. 1, a side view of one embodiment of a combine harvester 10 is illustrated in accordance with aspects of the present subject matter, particularly illustrating a portion of the harvester 10 cut-away to allow various internal components of the machine to be viewed. As shown, the harvester 10 may include an intake feeder system 12 having a header with a cutter 14 and a reel 16, an elevator 18, and a feed beater 20 arranged between the top of the elevator 18 and an associated threshing mechanism 22 of the harvester 10. In several embodiments, the feed beater 20 may take the form of a rotor with projecting paddles. In addition, as shown in FIG. 1, a rock trap or sump 100 may be positioned directly below the feed beater.

As is generally understood, the feed beater 20 may be configured to convey harvested crop material towards the threshing mechanism 22 while rocks and other foreign materials, which are generally heavier and denser than the crop, are impacted and downwardly discharged into the interior of the rock sump 100. For example, the rotation of the feed beater 20 may propel the rocks and other foreign materials downwardly through straw and chaff into the rock sump 100. As a result, the foreign materials may be separated from the crop material prior to reaching the threshing mechanism 22, thereby preventing damage to the threshing mechanism 22.

Figure 2:
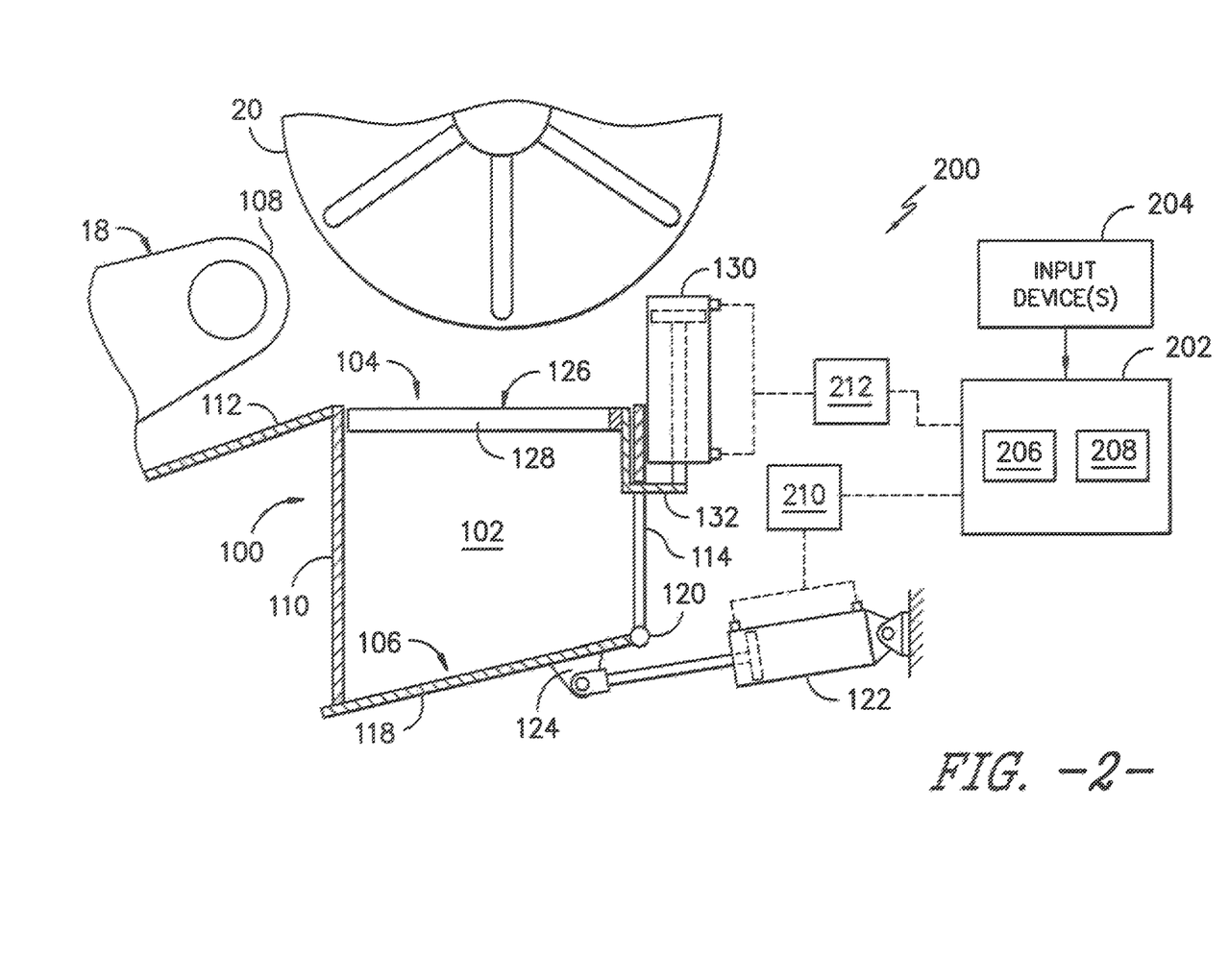
FIG. 2 illustrates a schematic view of one embodiment of a self-cleaning rock sump and an associated system in accordance with aspects of the present subject matter, particularly illustrating a sump door of the rock sump at a closed position while a grate of the rock sump is at a raised position.
Figure 3:
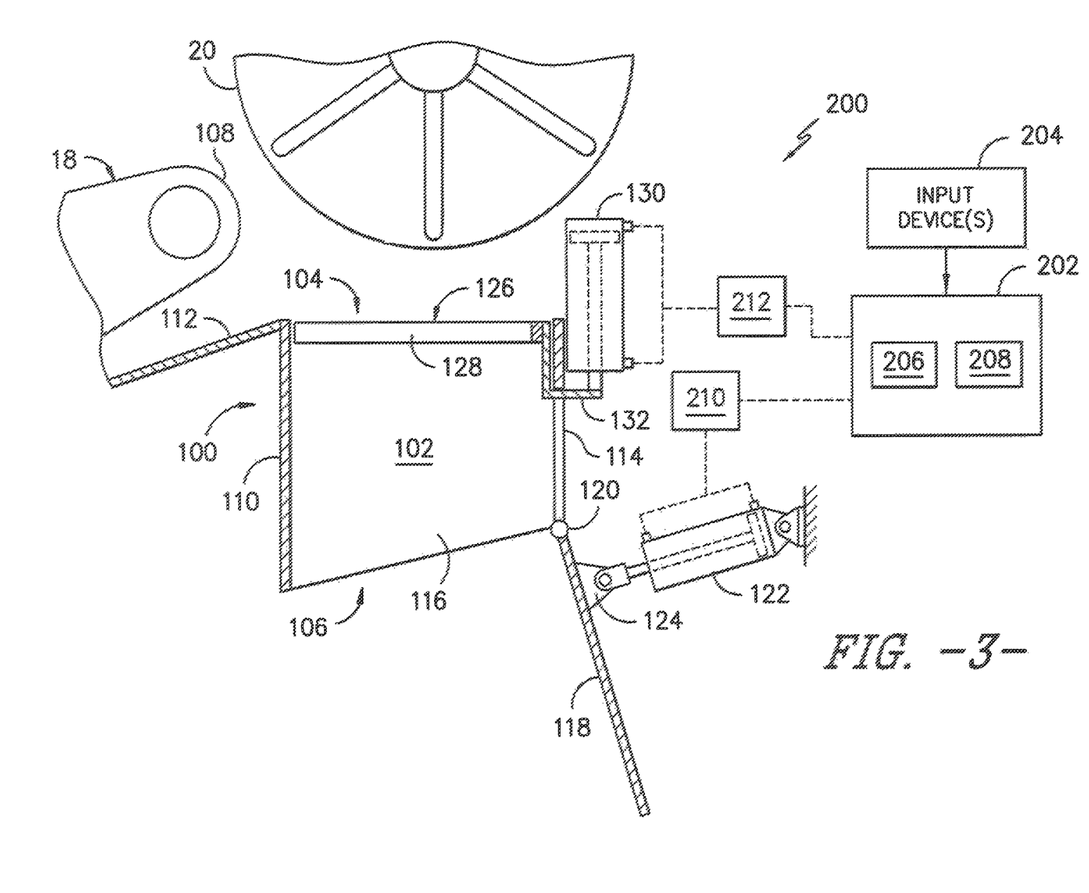
FIG. 3 illustrates another schematic view of the self-cleaning rock sump and associated system shown in FIG. 2, particularly illustrating the sump door moved from its closed position to an open position.
Figure 4:
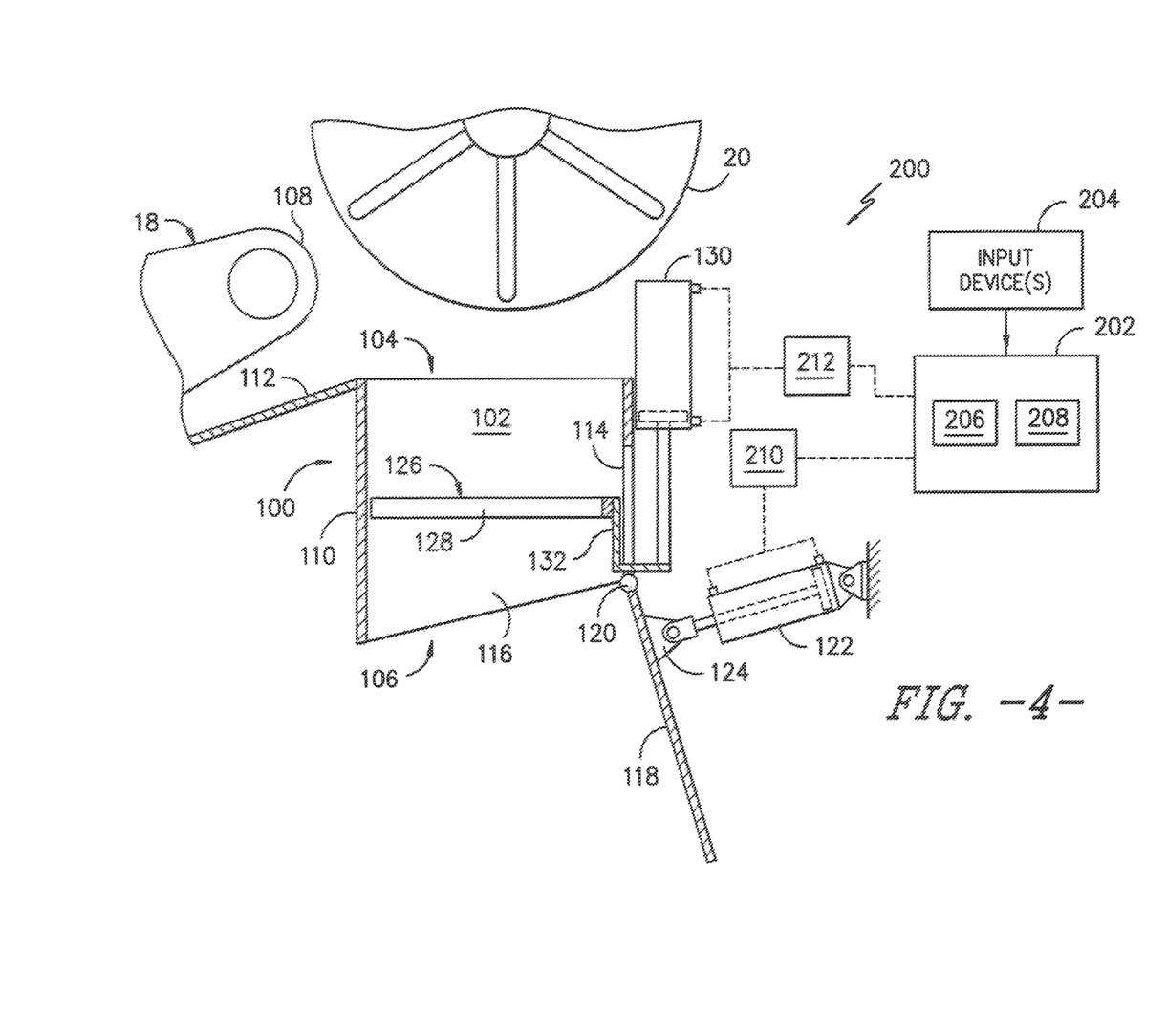
FIG. 4 illustrates a further schematic view of the self-cleaning rock sump and associated system shown in FIG. 2, particularly illustrating the sump door maintained at its opened position as the grate is moved from its raised position to lowered position to remove stuck or lodged foreign materials from the rock sump.

Referring now to FIGS. 2-4, several views of one embodiment of a self-cleaning rock sump 100 are illustrated in accordance with aspects of the present subject matter. For purposes of discussion, the rock sump 100 will be described herein with reference to the harvester 10 described above with reference to FIG. 1. However, it should be appreciated that, in general, the disclosed self-cleaning rock sump 100, as well as the related systems and methods, may generally be utilized with any suitable harvester having any suitable configuration to allow rocks and other foreign material collected by the harvester to be efficiently and effectively evacuated from the rock sump 100.

As shown in the illustrated embodiment, the rock sump 100 may generally include a collection chamber 102 defining an internal volume extending vertically between a top end 104 and a bottom end 106 for collecting and retaining rocks and other foreign material separated from the crop material via the feed beater 20. For instance, as shown in FIGS. 2-4, the collection chamber 102 may be located directly below the feed heater 20 such that foreign material conveyed towards the heater 20 from an aft end 108 of the elevator 18 is directly downwardly into the collection chamber 102. In one embodiment, the collection chamber 102 may include a front wall 110 extending downwardly relative to a floor 112 of the feeder 12 that defines a forward end of the chamber 102 and a back wall 114 spaced apart from the front wall 110 that defines a rear end of the chamber 102. Additionally, opposed sidewalls 116 (one of which is shown in FIGS. 3 and 4) may extend between the front and rear walls 110, 114 to defines the sides of the collection chamber 102.

Moreover, as shown in FIGS. 2-4, the rock sump 100 may also include a sump door 118 positioned at or adjacent to the bottom end 106 of the collection chamber 102. In general the door 118 may be configured to be pivotally coupled to a wall of the chamber 102 (e.g., at pivot point 120 defined relative to the back wall 114 of the chamber 102) to allow the door 118 to be pivoted or moved relative to the chamber 102 between a closed position and an opened position. As shown in FIG. 2, when in the closed position, the door 118 may generally define the bottom wall of the collection chamber 102, thereby allowing rocks and other foreign materials collected within the chamber 102 to be retained therein. However, as shown in FIGS. 3 and 4, when in the opened position, the door 118 may be pivoted away from the bottom end 106 of the collection chamber 102 to allow the foreign materials to be evacuated from the chamber 102.

In several embodiments, a door actuator 122 may be coupled to the sump door 118 (e.g., via a door coupling member 124) to allow the door 118 to be moved between its closed and opened positions. For instance, as shown in the illustrated embodiment, the door actuator 122 corresponds to a fluid-driven actuator, such as a hydraulic or pneumatic cylinder. However, in other embodiments, the door actuator 122 may correspond to any other suitable actuation device configured to move the door 118 between its closed and opened positions, such as a solenoid-driven actuator, a rack-and-pinion type actuator, or any other suitable actuation device.

Additionally, in accordance with aspects of the present subject matter, the rock sump 100 may also include a cleaning device configured to be moved within the collection chamber 102 between a raised position (FIGS. 2 and 3) and a lowered position (FIG. 4). Specifically, in several embodiments, the cleaning device may include an actuatable grate 126 (e.g., a finger grate) configured to extend forward-to-aft between the front and back walls 110, 114 of the collection chamber 102 and side-to-side between the opposed sidewalls 116 of the chamber 102. The grate 126 may generally include a plurality of fingers or grate elements 128 spaced apart from one another between the front and back walls 110, 114 of the collection chamber 102 and/or between the opposed sidewalls 116 of the chamber 102 such that open spaces or voids (not shown) are generally defined between adjacent grate elements 128 to allow rocks and other foreign material to pass through the grate 126. It should be appreciated that, although the cleaning device will generally be described herein as including an actuatable grate 126, the cleaning device may be formed from or include any other suitable component(s) that, when actuated relative to the collection chamber 102, is configured to contact or knock down materials remaining within the chamber 102.

During normal operation of the harvester 10, the grate 126 may be configured to be located at its raised position to maximize the capacity of the collection chamber 102. For example, as shown in FIGS. 2 and 3, when at the raised position, the grate 126 may be located at or adjacent to the top end 104 of the collection chamber 102. Thus, rocks and other foreign material separated from the crop material via the feed beater 20 may fall through the grate 126 and collect within the interior volume defined by the collection chamber 102. However, when it is desired to clean the rock sump 100, the gate 126 may be actuated from its raised position to its lowered position. For example, as shown in FIG. 4, when actuated to the lowered position, the grate may be moved away from top end 104 of the collection chamber 102 to a location closer to the bottom end 106 of the chamber 102. Accordingly, as the grate 126 is being lowered relative to the collection chamber 102, the grate elements 128 of the grate 126 may contact and break-up or otherwise knock down any foreign materials that have become stuck or lodged within the chamber 102, thereby allowing the foreign materials to be completely evacuated from the chamber 102.

As shown in FIGS. 2-4, a grate actuator 130 may be coupled to the grate 126 (e.g., via a grate coupling member 130 extending through the back wall 114 of the chamber 102) to allow the grate 126 to be moved within the collection chamber 102 between its raised and lowered positions. For instance, as shown in the illustrated embodiment, the grate actuator 130 corresponds to a fluid-driven actuator, such as a hydraulic or pneumatic cylinder. However, in other embodiments, the grate actuator 130 may correspond to any other suitable actuation device configured to actuate the grate 126 between its raised and lowered positions, such as a solenoid-driven actuator, a rack-and-pinion type actuator, or any other suitable actuation device.

Additionally, as shown in FIGS. 2-4, the grate actuator 130 may, in several embodiments, be separate from the door actuator 122. As such, the grate 126 may be actuated independent of the door 118 and vice versa. For example as will be described below, when cleaning the rock sump 100, the door 118 may be initially actuated independent of the grate 126 to move the door 118 from its closed position to its opened position. Thereafter, once the door 118 has been moved to the opened position, the grate 126 may be independently actuated relative to the collection chamber 102 to allow the grate 126 to be lowered towards the bottom end 106 of the chamber 102 to clean out any lodged or stuck materials.

As indicated above, in accordance with aspects of the present subject matter, the disclosed rock sump 100 may be included within or form part of an associated system 200 for cleaning or evacuating foreign materials from an agricultural harvester. Specifically, in several embodiments, the system 200 may include a controller 202 configured to electronically control the operation of both the door actuator 122 and the grate actuator 130 to allow the controller 202 to automatically execute a sump cleaning mode for cleaning out the rock sump 100. For example, upon receipt of a command from the operator of the harvester 10 via a suitable input device 204 (e.g., a button, knob, or any other suitable input device located within the cab of the harvester 10), the controller 202 may be configured to control the operation of the actuators 122, 130 in a manner that allows rocks and other foreign material to be fully evacuated from the sump 100.

In general, controller 202 may correspond to any suitable processor-based device known in the art, such as one or more computing devices. Thus, in several embodiments, the controller 202 may include one or more processor(s) 206 and associated memory device(s) 208 configured to perform a variety of computer-implemented functions. As used herein, the term "processor" refers not only to integrated circuits referred to in the art as being included in a computer, but also refers to a controller, a microcontroller, a microcomputer, a programmable logic controller (PLC), an application specific integrated circuit, and other programmable circuits. Additionally, the memory 208 of the controller 202 may generally comprise memory element(s) including, but pot limited to, computer readable medium (e.g., random access memory (RAM)), computer readable non-volatile medium (e.g., a flash memory), a floppy disk, a compact disc-read only memory (CD-ROM), a magneto-optical disk (MOD), a digital versatile disc (DVD) and/or other suitable memory elements. Such memory 208 may generally be configured to store suitable computer-readable instructions that, when implemented by the processor(s) 206, configure the controller 202 to perform various computer-implemented functions, such as one or more aspects of the control methodology described herein. In addition, the controller 202 may also include various other suitable components, such as a communications circuit or module, one or more input/output channels, a data/control bus and/or the like.

It should be appreciated that the controller 202 may correspond to an existing controller of the harvester 10 or the controller 202 may correspond to a separate controller. For instance, in one embodiment, the controller 202 may form all or part of a separate plug-in module that may be installed to allow for the disclosed system and method to be implemented without requiring additional software to be uploaded onto existing control devices of the harvester 10

In several embodiments, the various components of the rock sump 100 may be disposed in the configuration shown in FIG. 2 prior to initiation of the automatic sump cleaning mode, with the sump door 118 being located at the closed position and the grate 126 being located at the raised position. Thereafter, as shown in FIG. 3, when the sump cleaning mode is initiated, the controller 202 may be configured to initially control the operation of the door actuator 122 to move the sump door 118 from its closed position to its opened position. By doing so, any loose rocks and other foreign material contained within the collection chamber 102 may drop from the rock sump 100. However, as indicated above, in many instances, all or a portion of the foreign material may remain stuck or lodged within the collection chamber 102 upon opening of the sump door 118.

Thus, to break-up or dislodge any remaining foreign materials within the collection chamber 102, the controller 202 may be configured to actuate the grate 126 relative to the chamber 102. Specifically, once the door 118 has been moved to its opened position, the controller 202 may be configured to control the operation of the grate actuator 130 such that the grate 126 is moved within the collection chamber 102 from its raised position to its lowered position. As such, the grate 126 may serve to push any remaining materials out of the collection chamber 102 as it is being lowered within the chamber 102. Additionally, in one embodiment, the contract 202 may be configured to cycle the grate 126 between its raised and lowered positions two or more times while the door 118 is maintained at its opened position to ensure that the collection chamber 102 has been sufficiently cleaned. Once the rock sump 100 has been cleaned, the grate 126 may be returned to its raised position while the door 118 may be moved back to its closed position to allow rocks and other foreign material to be collected within the sump 100 during operation of the harvester 10.

It should be appreciated that, in embodiments in which the actuators 122, 130 correspond to fluid-driven actuators, the controller 202 may be configured to electronically control the operation of the actuators 122, 130 by controlling the operation of a valve(s) associated with each actuator 122, 130. For instance, as shown in FIGS. 2-4, the controller 202 may be communicatively coupled to a first pressure-regulating valve(s) 210 configured to regulate the flow of fluid supplied to the door actuator 122 and a second pressure-regulating valve(s) 212 configured to regulate the flow of fluid supplied to the grate actuator 130. In such an embodiment, by electronically controlling the operation of the valves 210, 212, the controller 202 may, in turn, independently control the operation of each actuator 122, 130. In other embodiments, depending on the configuration of each actuator 122, 130, the controller 202 may be communicatively coupled to any other suitable component(s) for controlling the operation of the actuator(s) 122, 130. For instance, in an embodiment in which each actuator 122, 130 corresponds to a solenoid-driven actuator, the controller 202 may be communicatively coupled directly to each actuator 122, 130 for controlling its operation. Alternatively, in an embodiment in which each actuator 122, 130 corresponds to a rack-and-pinion type actuator, the controller 202 may be communicatively coupled to a suitable rotational driver (e.g., an electric motor) for controlling the operation of each actuator 122, 130.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they include structural elements that do not differ from the literal language of the claims, or if they include equivalent structural elements with insubstantial differences from the literal languages of the claims.

What is claimed is:

1. A self-cleaning sump for an agricultural harvester, the self-cleaning sump comprising:
   a collection chamber defining a top end and a bottom end;
   a sump door positioned at the bottom end of the collection chamber, the sump door movable between an opened position and a closed position;
   a cleaning device including a grate movable within the collection chamber between a raised position and a lowered position, the grate configured to be positioned at or adjacent to the top end of the collection chamber when the grate is at the raised position such that material passes though the grate for collection within an interior volume of the collection chamber; and
   a first actuator coupled to the grate, the first actuator being configured to actuate the grate linearly such that the grate is moved along a linear travel path between the raised and lowered positions independent of the sump door,
   wherein, when the first actuator is activated, the grate is configured to contact the collected material contained within the collection chamber as the grate is moved along the linear travel path within the collection chamber between the top and bottom ends of the collection chamber.

2. The self-cleaning sump of claim 1, wherein, when at the lowered position, the grate is positioned closer to the bottom end of the collection chamber than when at the raised position.

3. The self-cleaning sump of claim 1, further comprising a second actuator coupled to the sump door, the second actuator being configured to actuate the sump door between the opened and closed positions independent of the cleaning device.

4. The self-cleaning sump of claim 3, wherein the sump door is pivotally coupled to a wall of the collection chamber, the second actuator being configured to pivot the sump door relative to the wall to move the sump door between the opened and closed positions.

5. A system for automatically cleaning an agricultural harvester, the system comprising:
   a sump including a collection chamber defining a top end and a bottom end, the sump further including a sump door positioned at the bottom end of the collection chamber, the sump door movable between an opened position and a closed position;
   a cleaning device including a grate movable within the collection chamber between a raised position and a lowered position, the grate configured to be positioned at or adjacent to the top end of the collection chamber when the grate is at the raised position such that material passes though the grate for collection within an interior volume of the collection chamber;
   a first actuator coupled to the grate, the first actuator being configured to actuate the grate linearly such that the grate is moved along a linear travel path between the raised and lowered positions independent of the sump door; and
   a controller configured to electronically control an operation of the first actuator,
   wherein, when the first actuator is activated by the controller, the grate is configured to contact the collected material contained within the collection chamber as the grate is moved along the linear travel path within the collection chamber between the top and bottom ends of the collection chamber.

6. The system of claim 5, wherein, when at the lowered position, the grate is positioned closer the bottom end of the collection chamber that when at the raised position.

7. The system of claim 5, further comprising a second actuator coupled to the sump door, the second actuator being configured to actuate the sump door between the opened and closed positions independent of the cleaning device.

8. The system of claim 7, wherein the sump door is pivotally coupled to a wall of the collection chamber, the second actuator being configured to pivot the sump door relative to the wall to move the sump door between the opened and closed positions.

9. The system of claim 7, wherein the controller is configured to electronically control an operation of the second actuator.

10. The system of claim 9, wherein the controller is configured to initiate an automatic sump cleaning mode upon receipt of an input from an operator of the harvester.

11. The system of claim 10, wherein, when executing the automatic sump cleaning mode, the controller is configured to initially control the operation of the second actuator to move the sump door to the opened position.

12. The system of claim 11, wherein the controller is configured to control the operation of the first actuator to move the grate linearly from the raised position to the lowered position after the sump door has been moved to the opened position.

13. The system of claim 12, wherein the controller is configured to cycle the grate between the raised and lowered positions when the sump door is at the opened position.

14. A method for automatically cleaning a sump of an agricultural harvester, the sump including a collection chamber defining a top end and a bottom end, the method comprising:
    moving, with a computing device, a sump door of the sump from a closed position to an opened position; and
    linearly actuating, with the computing device, a cleaning device including a grate within the collection chamber independent of the door such that the grate is moved along a linear travel path from a raised position to a lowered position relative to the collection chamber,
    wherein:
    the grate is positioned at or adjacent to the top end of the collection chamber when the grate is at the raised position such that material passes though the grate for collection within an interior volume of the collection chamber; and
    the grate is configured to contact the collected material contained within the collection chamber as the grate is moved along the linear travel path between the raised and lowered positions.

15. The method of claim 14, further comprising cycling the grate between the raised and lowered positions while the door is at the opened position.

16. The method of claim 14, wherein actuating the cleaning device comprises electronically controlling an operation of a first actuator coupled to the grate and wherein moving the sump door comprises electrically controlling an operation of a second actuator coupled to the sump door, the first actuator being separate from the second actuator.

* * * * *